May 22, 1956  J. F. CHVOSTA  2,746,111
MOLDING CLIPS AND THE LIKE
Filed March 26, 1953  2 Sheets-Sheet 1

INVENTOR
JERRY F. CHVOSTA
BY H. G. Lombard
ATTORNEY

May 22, 1956   J. F. CHVOSTA   2,746,111
MOLDING CLIPS AND THE LIKE
Filed March 26, 1953   2 Sheets-Sheet 2
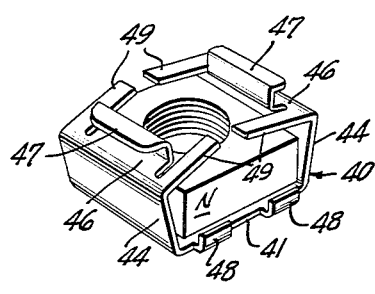
Fig. 7.
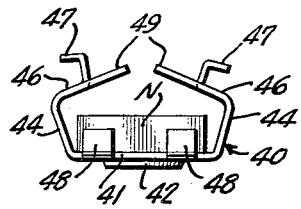
Fig. 8.
Fig. 9.
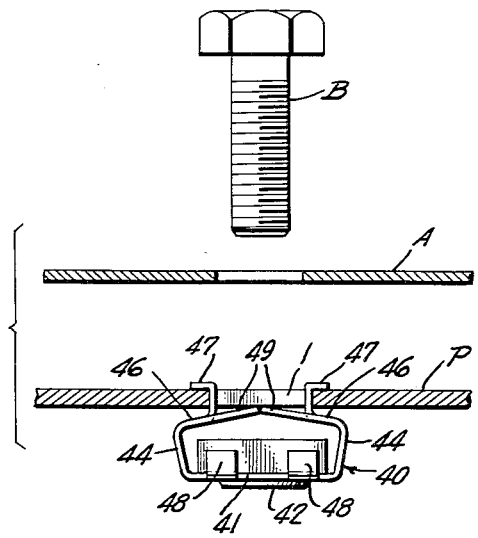
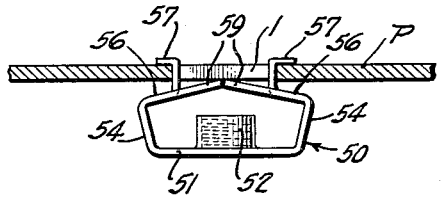
Fig. 10.
INVENTOR
JERRY F. CHVOSTA
BY  H. I. Lombard
ATTORNEY United States Patent Office 2,746,111
Patented May 22, 1956

2,746,111

MOLDING CLIPS AND THE LIKE

Jerry F. Chvosta, Cleveland, Ohio, assignor to Tinnerman Products, Inc., Cleveland, Ohio, a corporation of Ohio Application March 26, 1953, Serial No. 344,830

11 Claims. (Cl. 24—73)

This invention relates to attachable types of fasteners or fastening devices adapted for ready attachment to an apertured supporting part to provide the same with means for retaining a cooperating part thereon or for securing a cooperating member, object or article of manufacture to said supporting part.

The invention is directed, more particularly, to various forms of such fastening devices having a clip type attaching means comprising a pair of cooperating hooks for attaching the fastener in an opening in a supporting part together with means providing for an automatic positive lock of said hooks in attached position in said opening in the supporting part without the use of tools or special operations for locking the fastener in attached position. The arrangement is such that fasteners of this character, in accordance with the invention, are adapted to be easily and quickly applied to a positive locked attachment in an opening in a supporting part solely by the fingers of a worker in a manner which eliminates the need for tools for locking the fasteners in attached position while otherwise saving much of the time and effort required for attaching such fasteners when provided with locking means that must be manipulated by a tool in a special operation for locking the fasteners in attached position.

A primary object of the invention, therefore, is to provide various forms of fasteners of the kind described having a clip type attaching means comprising a pair of cooperating hooks for attaching the fastener in an opening in a supporting part together with self-locking means for preventing movement of said hooks in the direction toward removal or displacement from attached position in said opening in the supporting part.

Another object of the invention is to provide various fasteners of this character in which the self-locking means for the attaching hooks comprises one or more locking elements associated with each hook that are adapted for abutting relation with each other in the attached position of the hooks in a manner which resists and prevents movement of said hooks in the direction toward removal or displacement from attached position in the opening in the supporting part.

A further object of the invention is to provide various forms of fasteners, as aforesaid, wherein the self-locking means for the attaching hooks comprises one or more spring elements associated with each hook in the form of spring fingers, or the like, which are adapted to flex and yield automatically in the application of said hooks to attached position in the opening in the supporting part, and which are adapted for a positive abutting relation with each other in the attached position of said hooks in a manner which resists and prevents movement of said hooks in the direction toward removal or displacement from such attached position in the opening in the supporting part.

Further objects and advantages, and other new and useful features in the construction, arrangement and general combination of elements in the various fasteners of the invention will be apparent as the following description proceeds with reference to the accompanying drawings, for purposes of illustration but not of limitation, in which like reference characters designate like parts throughout, and in which:

Fig. 1 is a perspective view of one form of fastener in accordance with the invention as provided in a molding clip or retainer having cooperating attaching hooks together with inwardly extending elements adapted for abutting relation to provide an automatic self-locking of said attaching hooks in attached position in an opening in a supporting part;

Fig. 2 is a sectional view of a molding assembly showing the fastener of Fig. 1 in attached position in an opening in a supporting part with the attaching hooks locked in such attached position by the inwardly extending locking elements in abutting relation; and, Fig. 3 shows the fastener of Figs. 1 and 2 in edge elevation as manipulated in the initial application of the attaching hooks thereof to attached position in an opening in a supporting part.

Fig. 4 is a perspective view of another form of molding clip or retainer in accordance with the invention in which the locking elements in abutting relation are provided by partially severed strips stamped in the intermediate body portions of the fastener; and, Fig. 5 is a sectional view of a molding assembly embodying the fastener of Fig. 4, and shows the attaching hooks as locked in applied position in an opening in a supporting part by the inwardly extending locking elements in abutting relation.

Fig. 7 is a perspective view of a further embodiment of the invention in which the fastener is provided as a holder or retainer for a nut or similar clamping member;

Fig. 8 is a side elevational view of the assembled nut and nut holder of Fig. 7 showing the nut holder in its normal untensioned relation; and, Fig. 9 is a sectional view showing the nut and nut holder of Figs. 7 and 8 as attached in a panel opening in position for the application of a bolt to secure said panel in an assembly.

Fig. 10 shows another fastener in accordance with the invention as provided in the form of a unitary sheet metal nut and illustrates the same as attached in a panel opening in position for the application of a bolt or screw to secure said panel to a cooperating part.

The various fasteners of the invention are devices of general utility and may be readily constructed for use in a wide range and variety of assemblies in proportion to the size and contour of the parts secured. The fasteners are particularly suited for use in providing an apertured supporting part with means for securing thereto a cooperating part, object or article of manufacture by an operation taking place entirely from one side thereof as is required in a blind fastening assembly, for example.

Figure 1:
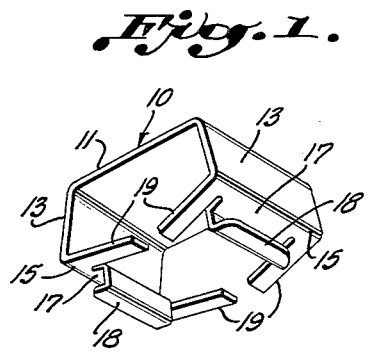
Figure 2:
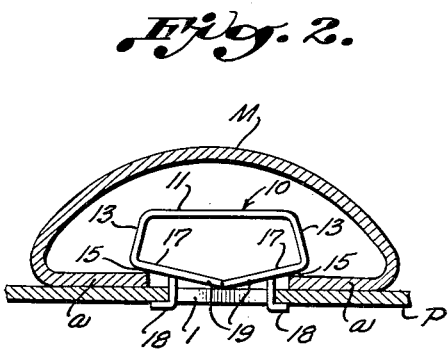
Figure 3:
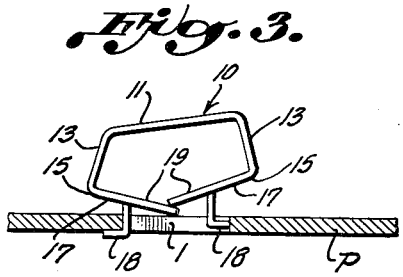

Referring now, more particularly, to the drawings, Figs. 1, 2 and 3 show one form of fastener in accordance with the invention as provided in a molding clip or retainer by which a molding M, trim strip, or similar object is mounted onto a supporting part P, by an operation taking place entirely from the forward or readily accessible side thereof. The molding retainers, designated generally 10, are provided in the manner of substantial clip devices comprising combined attaching means and article holding means, the attaching means being adapted to be easily and quickly applied to substantially locked fastening position in specially prepared assembling openings in the supporting part P from the outer or forward side thereof, whereupon the molding M or other object is then applied to the holding means of the retainer in fully mounted position on the supporting structure by an operation, likewise, taking place from the outer or forward side thereof. Thus, there is no need for access to the rearward side of the supporting part P as is necessary when the retainers are attached by bolt and nut fastenings required to be secured together from both sides of the supporting structure. The supporting part P, may be of any suitable material such as sheet metal, wood, fiber board, or the like; however, inasmuch as the invention is employed mainly in metallic structures, the supporting part P is usually in the form of a metallic panel or plate-like member provided with generally rectangular openings 1 in the form of slots, or the like.

The molding clip 10 may be readily constructed for attachment in a circular hole or other opening of any suitable design but the use of a generally rectangular opening 1 is advantageous in that it is relatively simple to form and otherwise provides for a fixed, nonrotative attachment of the molding clip. It will be understood that a suitable number of such openings 1, are prepared in the panel P according to the number of clips or retainers 10 to be used, with such openings or slots being provided in predetermined spaced relation along the path which the molding M or other object extends in mounted position on said panel P.

The molding clip 10 is constructed from a relatively small, inexpensive blank of sheet metal which is readily obtained from standard sheet metal strip stock with little loss or waste of material. Any suitable sheet metal may be employed but preferably that of a spring metal nature such as spring steel or cold rolled steel having spring-like characteristics. The blank is bent to provide a base or body portion 11 intermediate a pair of spring arms 13 which are formed from the ends of the blank and extend from said base 11 in the same general direction to define means for attaching the fastener in the opening 1 in the supporting part P, and means by which the molding M or other object is attached thereto by springing the longitudinal inturned flanges a of said molding into secured relation with said molding clip 10.

The spring arms 13 are inclined slightly outwardly in normal untensioned relation and are provided with inwardly bent portions defining shoulders 15 in the area of said bent portions and inwardly extending flanges 17. The ends of said inwardly bent flanges 17 are provided with spaced slits defining portions of reduced width which are return bent to define outwardly extending attaching hooks 18 having a width approximating the width of the generally rectangular opening 1 in the supporting part. The spring arms 13 are so provided that the hooks 18 are spaced apart in untensioned relation a distance greater than the length of the panel opening 1 such that said spring arms 13 must be compressed toward each other to permit said hooks 18 to be attached in the panel opening 1, as shown in Fig. 2. At the opposite sides of said hooks 18, the remaining side portions of the flanges 17, define yieldable spring fingers 19 extending inwardly toward each other.

The spring fingers 19 are in slightly outwardly inclined relation and have their extremities spaced apart as shown in Fig. 1 when normally untensioned. Said spring fingers 19 are of such length and otherwise so provided that when the spring arms 13 are compressed to attach the hooks 18 in the generally rectangular panel opening 1 as shown in Fig. 2, said fingers 19 are positioned outside of said panel opening 1 and are flexed inwardly in bearing engagement against the panel surface P adjacent the panel opening 1 in a manner whereby the extremities of said spring fingers 19 move toward each other and are positioned in directly opposite abutting relation. The arrangement, accordingly, is such that when the hooks 18 are attached in the panel opening 1, the extremities of said spring fingers 19 are in directly opposite abutting relation and thereby prevent any inward movement of the spring arms 13 toward each other as is necessary to remove said hooks 18 from attached position in said panel opening 1.

In the normal untensioned relation of the molding clip 10, as shown in Fig. 1, the extremities of the spring fingers 19 preferably are slightly out of line with each other as necessary to permit said extremities to overlap, as shown in Fig. 3, when the spring arms 13 of the clip are compressed toward each other in the initial application of the molding clip to attach the hooks 18 in the panel opening 1. In an alternate arrangement, the extremities of said spring fingers 19 may be provided substantially in line with each other and forced out of line to permit such overlapping of said extremities thereof, as shown in Fig. 3.

From the foregoing, it will be understood that in the initial application of the molding clip 10 to attach the hooks 18 in the panel opening 1, the spring arms 13 are compressed toward each other, as shown in Fig. 3, and the clip otherwise manipulated as necessary to provide an offset, overlapping relation of the extremities of the spring fingers 19 for permitting the hooks 18 to move toward each other. In this relation, the hooks 18 still have their extremities farther apart than the length of the panel opening 1. Accordingly, one hook 18 is passed through the panel opening 1 with the other hook 18 resting on the surface of the panel P adjacent said opening 1. The resiliency of the spring arms 13 enables the latter hook 18 to be pressed inwardly and sprung sufficiently so that it may also pass through the panel opening 1 and thus be received in said opening 1. The spring arms 13 are then released from their compressed condition and in attempting to assume their initial untensioned outwardly inclined relation, both hooks 18 automatically spread apart and positively engage the adjacent marginal edges of the panel opening, as shown in Fig. 2. The spring arms 13, as thus attached, do not assume their initial untensioned relation but rather, remain biased slightly inwardly in the engaged position of the hooks 18 in the panel opening 1 under continuously effective spring tension.

As the hooks 18 are thus attached in the panel opening 1, the spring fingers 19 bear on the adjacent panel surface P outside of said opening 1 as shown in Fig. 3. When the spring arms 13 are released from their compressed condition to seat said hooks 18 in final attached position in the panel opening 1, as shown in Fig. 2, the extremities of said spring fingers 19 spread apart from the position shown in Fig. 3 to that of Fig. 2 where the extremities of said fingers 19 are positioned in directly opposite abutting relation and thereby prevent any movement of the spring arms 13 toward each other in a direction which would permit removal or displacement of said hooks 18 from attached position in said panel opening 1. The molding clip 10 is thus positively locked in attached position in the panel opening against any force or load which might otherwise tend to disconnect the hooks 18 from attached relation with the engaged marginal edges of the panel opening 1.

In the described application of the molding clip 10 to a positively locked attachment in the panel opening, it will be appreciated that the device is manipulated solely by the fingers of a worker in a quick and easy operation without the use of tools, thereby providing highly important advantages in assembly line mass production methods of manufacture.

A suitable number of molding clips 10 are attached in similar panel openings 1 along the path which the molding M extends in mounted position on the panel P, whereupon said molding M is secured onto said clips by springing the inturned flanges a thereof into snap fastened engagement with the shoulders 15 on said clips 10 substantially as shown in Fig. 2.

Figure 4:
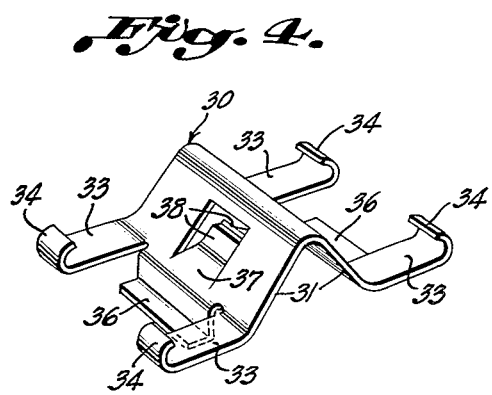
Figure 5:
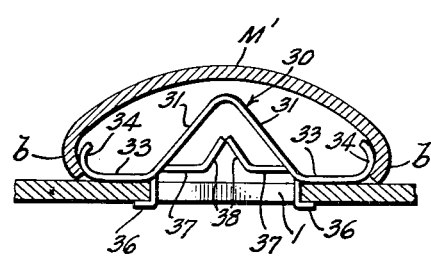

Figs. 4 and 5 show another form of molding clip 30 having a generally equivalent construction to that described with reference to Figs. 1–3, inclusive, in that it includes similar attaching hooks and spring fingers in abutting relation to retain said hooks in attached position in the panel opening 1. The molding clip 30 is particularly suited for mounting moldings of relatively wide cross section and accordingly, is formed from a relatively long strip which is bent intermediately to provide a pair of spring arms 31 between outwardly extending flanges 33 formed from the end portions of the blank in any desired length. The ends of the blank are suitably slit to provide said flanges 33 in the form of spaced strip-like extensions having the extremities thereof bent to provide resilient shoulders 34 adapted for mounting a molding M' by snap fastening engagement with the longitudinal side walls b of said molding as shown in Fig. 5.

A pair of similar outwardly extending hooks 36 is provided from the material between said spaced flanges 33 in integral relation to the spaced spring arms 31. The hooks 36, in effect, are carried by said spring arms 31 and are so spaced as to seat in attached position in the panel opening 1 with said spring arms in a tensioned or biased condition. The intermediate portions of said spring arms are partially severed to provide a pair of cooperating spring fingers 37 extending inwardly toward each other and having their ends bent into resilient abutments 38 in face to face abutting relation.

The molding clip 30 is easily and quickly attached in the panel opening 1 by compressing the spring arms 31 toward each other and seating the hooks 36 in said panel opening substantially as described with reference to the embodiment of Figs. 1–3. As the spring arms 31 are compressed, the abutments 38 on the ends of the spring fingers 37 yield as necessary for this purpose and, in the fully attached position of the hooks 36 in the panel opening 1, said spring fingers 37 are tensioned in said abutting relation in a manner which provides a pronounced outward spring force on the attaching hooks 36 that positively retains said hooks 36 in attached position in the panel opening 1.

Figure 6:
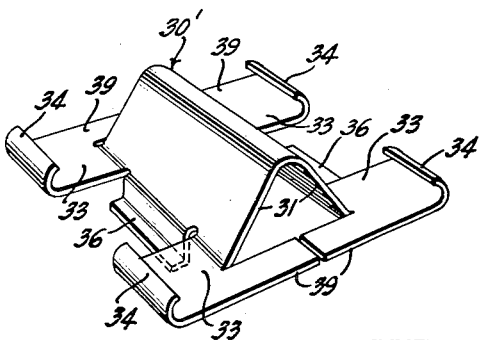
Fig. 6 is a perspective view showing another form of molding clip or retainer similar to that of Fig. 4 in which the inwardly extending locking elements are provided from side portions of the fastener.

Fig. 6 shows a molding clip 30' of the same general character as that disclosed in Figs. 4 and 5 but which is provided with spring fingers 39 in an alternate construction similar to those in the fastener of Figs. 1–3, inclusive. The clip 30' is provided from a relatively wider blank having suitable side portions which are partially severed to provide said fingers 39 at the sides of the spaced finges 33 with the ends of said fingers 39 in directly opposite abutting relation. The fastener 30' accordingly, is readily attached substantially as described with reference to Figs. 1–3, inclusive, by manipulating the clip 30' to apply the similar hooks 36 to attached position in the panel opening 1 with said spring fingers 39 seating on the adjacent panel surface outside the panel opening in a manner whereby the extremities of said spring fingers are in directly opposite abutting relation and thereby prevent any movement of the spring arms 31 inwardly toward each other in the direction for removal or displacement of the hooks 36 from attached position in the panel opening 1.

Figs. 7–9, inclusive, show another fastener in accordance with the invention as provided in the form of nut holder 40 for a nut N to be attached over the panel opening 1, Fig. 9, in readiness for the application of bolt B in securing a cooperating part A to said panel P. The nut holder 40 is constructed from a sheet metal section of a size and configuration determined by the shape and size of the nut N with which it is to be used and may be readily provided for use with any other kind of nut or equivalent work clamping member such as the head of a bolt.

In the present example, the holder 40 is shown as constructed for use with a standard square threaded nut N to be attached in fastening position over a generally rectangular opening 1 in a supporting part such as a panel or plate P. The nut holder 40 may be readily constructed for attachment in a circular hole or other opening of any selected design but the use of a generally rectangular opening, as shown, is advantageous in that it is relatively simple to form and otherwise provides for a fixed nonrotative attachment of the nut holder in attached position. Likewise, any suitable sheet metal may be employed in providing the nut holder 40, but preferably that of a spring metal nature such as spring steel or cold rolled steel having spring-like characteristics.

The sheet metal blank forming the nut holder 40 is bent to define a central body portion 41 having an enlarged bolt passage 42 and end portions extending in the same general direction to form a pair of spring arms 44 having opposing wall portions disposed in slightly outwardly inclined relation when normally untensioned. Said spring arms 44 have the free end portions thereof provided in a reduced width slightly less than the width of the panel opening 1, and said free end portions of reduced width are formed to provide inwardly bent flanges 46 together with return bent outwardly extending hook elements 47, or the like, which in normal untensioned relation, are spaced apart a distance greater than the length of the generally rectangular panel opening 1. The said hook elements 47, otherwise, are preferably provided in a predetermined spacing from the inward flanges 46 approximating the thickness of the panel P adjacent the panel opening 1 so as to clasp the opposite surfaces of the marginal portions of said panel opening 1 in close engagement therewith. The spring arms 44 extend from the central body portion 11 in entirely free and independent relation so that they may be readily flexed as necessary for an easy and quick attachment of the hooks 47 with the marginal edges of said panel opening 1. At the sides of the nut holder 40, one or two tabs or lugs 48 are bent to extend downwardly from the side edges of the central body portion 41.

The general form of nut holder 40, accordingly, comprises a cage-like structure in which the nut N is retained by the opposing walls of the spring arms 44 at the ends of the nut holder and the tabs or lugs 48 along the sides of the nut holder. The nut holder 40 is constructed to conform generally to the shape of the nut N but in a somewhat larger size to provide for a floating mounting of the nut N within the nut holder 40. The arrangement, otherwise, is such that the spring arms 44 may be spread apart as necessary to slip the nut N through the space between the hooks 47 on the ends thereof to a position in which the holder retains the nut N in the manner of a cage device defined by said spring arms 44 and the tabs or lugs 48, as aforesaid. The nut N, as thus retained by the nut holder of relatively larger size, has its threaded opening in line with the enlarged bolt passage 42 in the central body 41 of the holder and is capable of considerable shifting or adjustment within the nut holder as necessary to compensate for misalignment or other irregularities in the bolt openings in the parts to be secured.

The spring arms 44 are so provided that the hooks 47 are spaced apart in untensioned relation a distance greater than the length of the panel opening 1 such that said spring arms 44 must be compressed toward each other to permit said hooks 47 to be attached in the panel opening 1, as aforesaid. At the opposite sides of said hooks 47, the remaining portions of the ends of the blank define yieldable spring fingers 49 extending inwardly toward each other.

The spring fingers 49 extend in slightly outwardly inclined relation and have their extremities spaced apart substantially as shown in Fig. 8 when normally untensioned. Said spring fingers 49 are of such length and otherwise are so provided that when the spring arms 44 are compressed to attach the hooks 47 in the generally rectangular panel opening 1 as shown in Fig. 9, said fingers 49 are positioned outside of said panel opening 1 and are flexed inwardly in bearing engagement against the panel surface P adjacent the panel opening 1 in a manner whereby the extremities of said spring fingers 49 move toward each other and are positioned in directly opposite abutting relation. The arrangement, accordingly, is such that when the hooks 47 are attached in the panel opening 1, the extremities of said spring fingers 49 are in directly opposite abutting relation and thereby prevent any inward movement of the spring arms 44 toward each other as is necessary to remove said hooks 47 from attached position in said panel opening 1.

The spring fingers 49, similar to those in the fastener of Figs. 1–3, inclusive, preferably have their extremities out of line with each other as necessary to permit said extremities to overlap, as shown in Fig. 3, when the spring arms 44 of the nut holder 40 are compressed toward each other in the initial application of said nut holder 1 to attach the hooks 47 in the panel opening 1. Likewise, in an alternate arrangement, the extremities of said spring fingers 49 may be provided substantially in line with each other and forced out of line to permit such overlapping of said extremities thereof as shown in Fig. 3.

The nut holder 40 otherwise has the same general construction as the fastener of Figs. 1–3, inclusive, and is installed in the same general procedure described by manipulating said nut holder 40 to attach the hooks 47 in the panel opening 1, Fig. 9, with said spring fingers 49 seating on the adjacent panel surface P outside the panel opening 1, in a manner whereby the extremities of said spring fingers 49 are in directly opposite abutting relation and thereby prevent any movement of the spring arm 44 inwardly toward each other in the direction for removal or displacement of said hooks 47 from attached position in the panel opening 1, Fig. 9.

The clip 40 is equally adapted for use as a retainer for a bolt or other work clamping fastener having a head approximating the size and proportions of the nut N with which the clip is used as a nut holder as disclosed with reference to Figs. 7–9, inclusive. The head of such a bolt is readily assembled in the holder 40 and this assembly positioned over the panel opening 1 with the shank of the bolt projecting through the panel opening whereupon the holder or retainer 40 is secured in attached relation in said panel opening 1 in the same general procedure described with the hooks 47 engaging the marginal edges of the panel opening 1, and with the spring fingers 49 having their extremities in abutting relation to lock said hooks 47 in such attached position in the panel opening 1.

Fig. 10 shows another fastener in accordance with the invention as provided in the form of a unitary sheet metal spring nut 50 having similar self-locking attaching means for holding said nut 50 over an opening in a panel P in position for receiving a bolt or screw for securing a cooperating part to said panel P. The body of the spring nut 50 is provided in the same basic construction as that of the previously described forms of the invention to comprise a base 51 provided with a threaded hub 52 or equivalent thread opening in said base 51 for threadedly engaging the bolt or screw to be employed. The base 51 is provided between a pair of outwardly inclined spring arms 54 having their ends formed to provide inwardly extending flanges 56 and outwardly extending hooks 57 together with spring fingers 59 extending inwardly toward each other. This form of fastener, likewise, is attached in the procedure described with reference to Figs. 1–3, inclusive, to secure the hooks 57 in the panel opening 1, Fig. 10, with the extremities of said spring fingers 59 in directly opposite abutting relation in a manner which prevents movement of the spring arms 54 inwardly toward each other in the direction for removal or displacement of said hooks 57 from attached position in said panel opening 1.

The fastener, in any form, preferably is constructed of relatively thin sheet metal the thickness of which is selected according to service requirements and the predetermined size of the parts to be secured. The fastener is most effective when provided of spring metal suitably tempered and otherwise treated to give the desired toughness and hardness, particularly in the case of devices intended for use in heavy duty applications. A cheap and highly satisfactory fastener may be provided from cold rolled metal such as cold rolled steel which is untempered but of a spring metal nature and capable of providing an effective and reliable fastening device as and for the purposes described.

While the invention has been described in detail with specific examples, such examples are intended as illustrations only inasmuch as the invention fully contemplates various modifications which may be provided without departing from the spirit and scope of the invention.

What is claimed is:

1. A fastener comprising a piece of sheet metal having opposite end portions bent to define a pair of spaced arms provided with outwardly extending hooks on the free ends of said spaced arms for attaching the fastener in a work opening, and elements on said arms having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

2. A fastener comprising a piece of sheet metal having opposite end portions bent to define a pair of spaced arms provided with outwardly extending hooks on the free ends of said spaced arms for attaching the fastener in a work opening, and elements on said arms at opposite sides of said hooks having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

3. A fastener comprising a piece of sheet metal having opposite end portions bent to define a pair of spaced arms provided with outwardly extending hooks on the free ends of said spaced arms for attaching the fastener in a work opening, and elements on said arms at opposite sides of said hooks comprising substantially flat spring fingers extending inwardly toward each other and having their extremities adapted for abutting relation to prevent relative movement of said arms inwardly toward each other in the attached position of said hooks in said work opening, thereby retaining said hooks on said arms against removal or displacement from attached position in said work opening.

4. A fastener comprising a piece of sheet metal having opposite end portions bent to define a pair of spaced arms provided with outwardly extending hooks on the free ends of said spaced arms for attaching the fastener in a work opening, and elements provided by partially severed strips in the intermediate portions of said arms, said elements having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

5. A fastener for a molding or other object comprising a piece of sheet metal having opposite end portions bent to define a pair of spaced arms provided with outwardly extending hooks on the free ends of said spaced arms for attaching the fastener in a work opening, shoulders on said arms for securing said object in mounted position, and elements on said arms having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

6. A fastener for a molding or other object comprising a piece of sheet metal having opposite end portions bent to define a pair of spaced arms provided with outwardly extending hooks on the free ends of said spaced arms for attaching the fastener in a work opening, shoulders on said arms for securing said object in mounted position, and elements on said arms at opposite sides of said hooks comprising substantially flat spring fingers extending inwardly toward each other and having their extremities adapted for abutting relation to prevent movement of said arms inwardly toward each other in the attached position of said hooks in said work opening, thereby retaining said hooks on said arms against removal or displacement from attached position in said work opening.

7. A fastener for a molding or other object comprising a piece of sheet metal having opposite end portions bent to define a pair of spaced arms provided with outwardly extending hooks on the free ends of said spaced arms for attaching the fastener in a work opening, outwardly extending flanges carried by said arms and provided with shoulders for securing said object in mounted position, and elements having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

8. A fastener for a molding or other object comprising a piece of sheet metal having opposite end portions bent to define a pair of spaced arms provided with outwardly extending hooks on the free ends of said spaced arms for attaching the fastener in a work opening, outwardly extending flanges carried by said arms at opposite sides of said hooks and provided with shoulders for securing said object in mounted position, and elements comprising substantially flat spring fingers having their extremities extending inwardly toward each other and adapted for abutting relation to prevent movement of said arms inwardly toward each other in the attached position of said hooks in said work opening, thereby retaining said hooks on said arms against removal or displacement from attached position in said work opening.

9. A fastener comprising a holder for a nut or bolt head, said holder comprising a piece of sheet metal having opposite end portions bent to define a pair of spaced arms for retaining the nut or bolt head therebetween and provided with outwardly extending hooks on the free ends of said spaced arms for attaching said holder in a work opening, and elements on said arms having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

10. A fastener comprising a holder for a nut or bolt head, said holder comprising a piece of sheet metal having opposite end portions bent to define a pair of spaced arms for retaining the nut or bolt head therebetween and provided with outwardly extending hooks on the free ends of said spaced arms for attaching said holder in a work opening, and elements on said arms at opposite sides of said hooks comprising substantially flat spring fingers extending inwardly toward each other and having their extremities adapted for abutting relation to prevent movement of said arms inwardly toward each other in the attached position of said hooks in said work opening, thereby retaining said hooks on said arms against removal or displacement from attached position in said work opening.

11. A fastener comprising a spring nut provided by a piece of sheet metal having a portion carrying means for threadedly engaging a bolt or screw and opposite end portions defining a pair of spaced arms provided with outwardly extending hooks on the free ends of said spaced arms for attaching the fastener in a work opening, and elements on said arms at opposite sides of said hooks having free ends extending inwardly toward each other and adapted for abutting relation to prevent movement of said arms inwardly toward each other in the attached position of said hooks in said work opening, thereby retaining said hooks on said arms against removal or displacement from attached position in said work opening.

References Cited in the file of this patent

UNITED STATES PATENTS

| | | |
|---|---|---|
| 2,086,288 | Van Uum | July 6, 1937 |
| 2,142,429 | Wiley | Jan. 3, 1939 |
| 2,588,251 | Kost | Mar. 4, 1952 |
| 2,596,332 | Flora | May 13, 1952 |
| 2,611,166 | Wiley | Sept. 23, 1952 |